United States Patent
Yoon et al.

(10) Patent No.: US 12,520,000 B2
(45) Date of Patent: Jan. 6, 2026

(54) REMOTE CONTROL DEVICE, ELECTRONIC DEVICE AND CONTROL METHODS THEREOF

(71) Applicant: SAMSUNG ELECTRONICS CO., LTD., Suwon-si (KR)

(72) Inventors: Sukhoon Yoon, Suwon-si (KR); Kwanyoung Kim, Suwon-si (KR); Minsup Kim, Suwon-si (KR); Kihyun Song, Suwon-si (KR); Wonjae Lee, Suwon-si (KR); Jongkeun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/533,948

(22) Filed: Dec. 8, 2023

(65) Prior Publication Data
US 2024/0107102 A1 Mar. 28, 2024

Related U.S. Application Data

(63) Continuation of application No. PCT/KR2022/009642, filed on Jul. 5, 2022.

(30) Foreign Application Priority Data

Dec. 8, 2021 (KR) .................. 10-2021-0101745

(51) Int. Cl.
*H04N 21/422* (2011.01)

(52) U.S. Cl.
CPC .............. *H04N 21/42221* (2013.01)

(58) Field of Classification Search
CPC ................................ H04N 21/42221
See application file for complete search history.

(56) References Cited

U.S. PATENT DOCUMENTS

| 7,688,244 B2 | 3/2010 | Lee et al. |
| 8,068,013 B2 | 11/2011 | Otsuka et al. |

(Continued)

FOREIGN PATENT DOCUMENTS

| JP | 7-38980 A | 2/1995 |
| JP | 8-66561 A | 3/1996 |

(Continued)

OTHER PUBLICATIONS

Communication dated Oct. 21, 2022, issued by the International Searching Authority in counterpart International Application No. PCT/KR2022/009642 (PCT/ISA/210).

(Continued)

*Primary Examiner* — Randy A Flynn
(74) *Attorney, Agent, or Firm* — Sughrue Mion, PLLC

(57) ABSTRACT

A remote control device is disclosed. a remote control device includes: a user interface; a memory storing at least one instruction and a plurality of binary codes; a communication interface; and at least one processor operatively connected with the user interface, the memory, and the communication interface and configured to execute the at least one instruction to: identify, based on a user command receiving through the user interface, a binary code corresponding to the user command from among the plurality of binary codes, identify, based on a pre-set number of bit units, a plurality of bit groups corresponding to the binary code, and control the communication interface to transmit a first pulse signal corresponding to the plurality of bit groups.

11 Claims, 11 Drawing Sheets

(56) References Cited

U.S. PATENT DOCUMENTS

| | | |
|---|---|---|
| 11,228,797 B2 | 1/2022 | Kim et al. |
| 11,528,524 B1* | 12/2022 | Yang .................... H04N 21/436 |
| 2002/0196853 A1* | 12/2002 | Liang .................... H04N 19/90 |
| | | 375/E7.206 |
| 2005/0204246 A1 | 9/2005 | Saka |
| 2007/0069918 A1* | 3/2007 | You ........................ G08C 23/04 |
| | | 340/12.34 |
| 2007/0234383 A1 | 10/2007 | Miwa |
| 2009/0134948 A1* | 5/2009 | Miwa ................. H04L 25/4902 |
| | | 332/112 |
| 2013/0113388 A1* | 5/2013 | Reams .................. H05B 45/10 |
| | | 315/250 |
| 2015/0279208 A1* | 10/2015 | Li .......................... G08C 23/04 |
| | | 398/106 |
| 2020/0242918 A1 | 7/2020 | Pan |

FOREIGN PATENT DOCUMENTS

| | | |
|---|---|---|
| JP | 2008-172715 A | 7/2008 |
| JP | 2011-55399 A | 3/2011 |
| KR | 10-2006-0070825 A | 6/2006 |
| KR | 10-2006-0084574 A | 7/2006 |
| KR | 10-2010-0037234 A | 4/2010 |
| KR | 10-2015-0122571 A | 11/2015 |
| KR | 10-2016-0043397 A | 4/2016 |
| KR | 10-2020-0037567 A | 4/2020 |

OTHER PUBLICATIONS

Communication dated Oct. 21, 2022, issued by the International Searching Authority in counterpart International Application No. PCT/KR2022/009642 (PCT/ISA/237).

Communication dated Oct. 27, 2025, issued by the Korean Patent Office in Korean Application No. 10-2021-0101745.

* cited by examiner

FIG. 5

| | CUSTOM | | | | DATA | | | | END |
|---|---|---|---|---|---|---|---|---|---|
| Hex | 0 | 7 | 0 | 7 | 1 | 0 | E | F | - |
| Binary | 0000 | 0111 | 0000 | 0111 | 0001 | 0000 | 1110 | 1111 | - |
| Oct | 000 001 | 110 000 | 011 100 | 010 000 | 111 011 110 | | | | - |

'0' (dummy)

0 1 6   0 3 4   2 0 7   3 6   E

Header

REMOTE CONTROL DEVICE, ELECTRONIC DEVICE AND CONTROL METHODS THEREOF

CROSS-REFERENCE TO RELATED APPLICATIONS

This application is a by-pass continuation application of International Application No. PCT/KR2022/009642, filed on Jul. 5, 2022, which is based on and claims priority to Korean Patent Application No. 10-2021-0101745, filed on Aug. 3, 2021, in the Korean Intellectual Property Office, the disclosures of which are incorporated by reference herein their entireties.

BACKGROUND

1. Field

The disclosure relates to a remote control device, an electronic device, and methods thereof. More particularly, the disclosure relates to a remote control device that transmits and receives control commands, an electronic device, and methods thereof.

2. Description of the Related Art

A majority of TV users control a TV or external devices (for example, set top box and over-the-top) through a remote controller. Power supplied to the above-described remote controller usually utilizes typical batteries (AAA size, AA size, etc.). Use of the above-described batteries increase carbon-emissions and induce environmental pollution. Accordingly, there is a need to reduce energy used by the remote controller.

Based on a protocol established between the remote controller and the TV (or the external devices), Infrared (IR) key values may be transferred from the remote controller to the TV (or the external devices). For example, protocols such as NEC, RC5, RC6, SIRC, RCA, and YAMU may be used. Through commonly used protocols as described above, the device may be controlled with IR.

For example, as shown in FIG. 1A, a remote controller signal may include general keys (including headers and data) and a plurality of bursts (pulses). In an example, as shown in FIG. 1B, the header may include a pulse of 4.5 ms and a pulse of 0.56 ms. An interval between the two pulses may be 4.5 ms. Data 1 may be represented as a pulse of 0.56 ms with an interval from a previous pulse as 1.69 ms. Data 0 may be represented as a pulse of 0.56 ms with an interval from a previous pulse as 0.56 ms. That is, in the related art, one pulse was used to represent respective binary data of the remote controller signal, and power may be consumed for each pulse.

Accordingly, there is a need to develop a method for reducing power consumption caused by the above described operation in the related art.

SUMMARY

The disclosure addresses the above-described need. Provided are a remote control device, an electronic device, and methods thereof that reduce power consumption in a process of controlling the electronic device by the remote control device.

According to an aspect of the disclosure, a remote control device includes: a user interface; a memory storing at least one instruction and a plurality of binary codes; a communication interface; and at least one processor operatively connected with the user interface, the memory, and the communication interface and configured to execute the at least one instruction to: identify, based on a user command receiving through the user interface, a binary code corresponding to the user command from among the plurality of binary codes, identify, based on a pre-set number of bit units, a plurality of bit groups corresponding to the binary code, and control the communication interface to transmit a first pulse signal corresponding to the plurality of bit groups.

In an embodiment, the pre-set number is 3.

In an embodiment, the at least one processor is configured to execute the at least one instruction further to control the communication interface to determine a pulse of a first group and an interval between pulses of a second group directly after the first group, based on binary data of the first group from among the plurality of bit groups.

In an embodiment, the pulse of the first group and the interval between pulses of the second group are proportionate to a size of binary data of the first group.

In an embodiment, the plurality of bit groups are all same in terms of a width of a pulse.

In an embodiment, the at least one processor is configured to execute the at least one instruction further to change the pre-set number of bit units based on a battery state of the remote control device.

In an embodiment, the at least one processor is configured to execute the at least one instruction further to control the communication interface to transmit header data comprising information about the pre-set number of bit units.

In an embodiment, the at least one processor is configured to execute the at least one instruction further to control the communication interface to transmit a second pulse signal corresponding to header data, and to transmit the first pulse signal corresponding to the plurality of bit groups, and wherein the second pulse signal comprises a pulse of 1.2 ms and a low value of 1.2 ms.

According to an aspect of the disclosure, a method performed by a remote control device, includes: identifying, based on a user command, a binary code corresponding to the user command from among a plurality of binary codes stored in the remote control device; identifying, based on a pre-set number of bit units, a plurality of bit groups corresponding to the binary code; and transmitting a pulse signal corresponding to the plurality of bit groups. In an embodiment, the pre-set number is 3.

In an embodiment, the transmitting the pulse signal corresponding to the plurality of bit groups comprises determining a pulse of a first group and an interval between pulses of a second group directly after the first group based on binary data of the first group from among the plurality of bit groups.

In an embodiment, the pulse of the first group and the interval between pulses of the second group are proportionate to a size of binary data of the first group.

In an embodiment, the plurality of bit groups are all same in terms of a width of a pulse.

In an embodiment, the method further includes changing the pre-set number of bit units based on a battery state of the remote control device.

In an embodiment, the transmitting the pulse signal corresponding to the plurality of bit groups includes transmitting header data comprising information about the pre-set number of bit units.

According to one or more embodiments of the disclosure as described above, a remote control device may reduce power consumption by transmitting a plurality of bits included in a binary code as one pulse signal for every pre-set number of bit units.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 illustrates an operation of identifying a plurality of bit groups corresponding to a binary code, according to an embodiment of the disclosure;

DETAILED DESCRIPTION

Figure 1A:
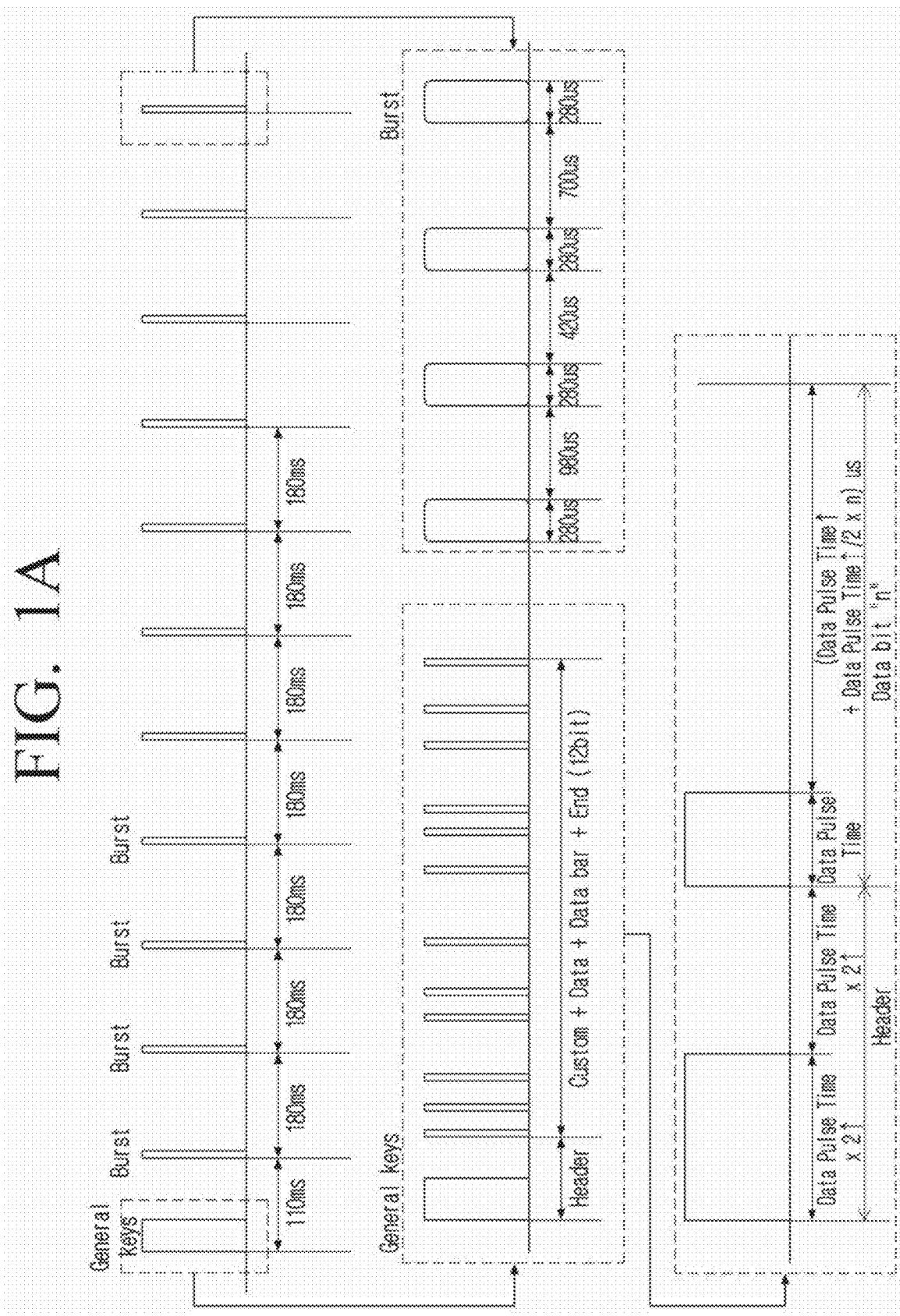
FIG. 1A and FIG. 1B illustrate diagrams in the related art.
Figure 1B:
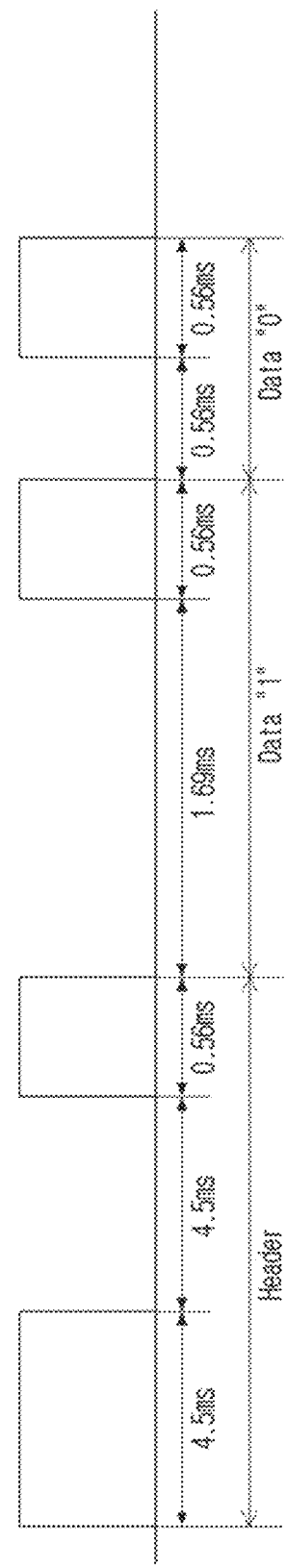

The disclosure will be described in detail below with reference to the accompanying drawings.

Terms used in describing the embodiments of the disclosure are general terms selected that are currently widely used considering their function herein. However, the terms may change depending on intention, legal or technical interpretation, emergence of new technologies, and the like of those skilled in the related art. In addition, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "have," "may have," "include," "may include," or the like are used to designate a presence of a corresponding characteristic (e.g., elements such as numerical value, function, operation, or component), and not to preclude a presence or a possibility of additional characteristics.

Expressions such as "first," "second," "1st," "2nd," and so on used herein may be used to refer to various elements regardless of order and/or importance. Further, it should be noted that the expressions are merely used to distinguish an element from another element and not to limit the relevant elements.

In this disclosure, the term "user" may refer to a person using an electronic device or an device (e.g., artificial intelligence electronic device) using an electronic device.

The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. The expression "at least one of a, b, or c" may indicate only a, only b, only c, both a and b, both a and c, both b and c, all of a, b, and c, or variations thereof. Similarly, the term "set" means one or more. Accordingly, the set of items may be a single item or a collection of two or more items.

One or more embodiments of the disclosure will be described in greater detail below with reference to the accompanied drawings.

Figure 2:
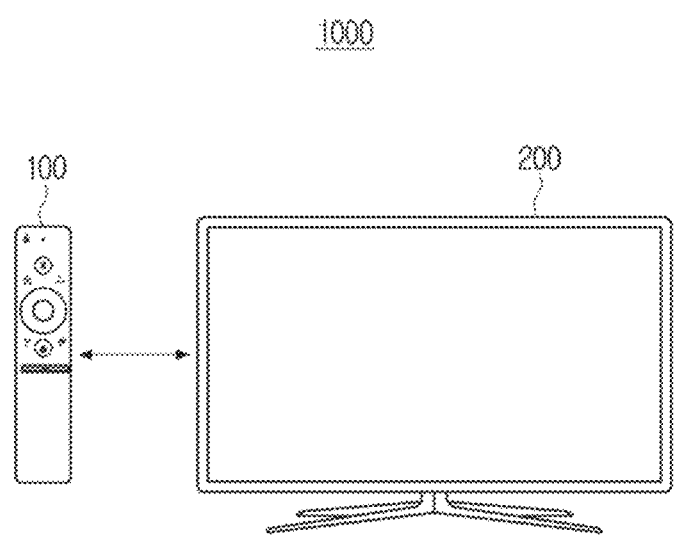
FIG. 2 illustrates an electronic system according to an embodiment of the disclosure.

FIG. 2 is a diagram illustrating an electronic system 1000 according to an embodiment of the disclosure. As shown in FIG. 2, the electronic system 1000 may include a remote control device 100 and an electronic device 200.

The remote control device 100 may be a device configured to transmit a control command for controlling the electronic device 200 to the electronic device 200, and may be a remote controller. However, the above is not limited thereto, and the remote control device 100 may be a device which can be implemented as a smartphone, a tablet PC, a wearable device, and the like, and installed with an application for controlling the electronic device 200, and may be any device so long as it can control the electronic device 200.

The remote control device 100 may identify, based on a pre-set number of bit units, a plurality of bit groups corresponding to a binary code corresponding to an operated button according to a button input by a user, and transmit a pulse signal corresponding to the plurality of bit groups.

For example, the remote control device 100 may identify, in a unit of 3 bits, a plurality of bit groups corresponding to the binary code corresponding to the operated button, and transmit one pulse signal for every one bit group. In this case, the 3 bits may be transmitted as one pulse and power consumption of the remote control device 100 may be reduced.

The electronic device 200 may be a device configured to receive a control command from the remote control device 100, and perform an operation according to the control command, examples of thereof may include a set top box (STB), a desktop PC, a notebook, a smartphone, a tablet PC, a server, a TV, and the like. However the above is not limited thereto, and the electronic device 200 may be any device so long as it can receive a control command from the remote control device 100 and perform an operation according to the control command.

The electronic device 200 may be configured to identify, based on a pulse signal being received from the remote control device 100, a plurality of bit groups based on an interval between pulses included in the pulse signal, and perform a corresponding operation by identifying the binary code corresponding to the plurality of bit groups from among a plurality of binary codes.

That is, the electronic device 200 may be a device capable of interpreting the control command transmitted from the remote control device 100 with reduced power consumption.

In the above, operations of the remote control device 100 and the electronic device 200 included in the electronic system 1000 have been briefly described. A method of reducing power consumption based on an operation of the remote control device 100 will be described in detail below.

Figure 3:
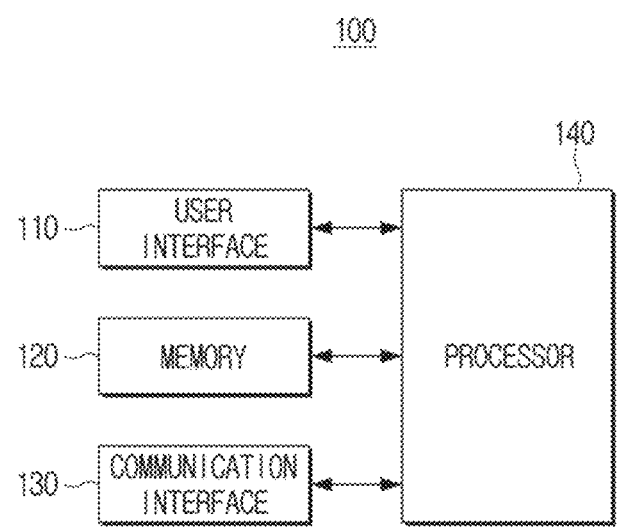
FIG. 3 illustrates a configuration of a remote control device according to an embodiment of the disclosure.

FIG. 3 is a block diagram illustrating a configuration of the remote control device 100 according to an embodiment of the disclosure.

Referring to FIG. 3, the remote control device 100 may include a user interface 110, a memory 120, a communication interface 130, and a processor 140.

The user interface 110 may be a configuration for receiving a user command, and may be implemented as a button, a touch pad, a mouse, a keyboard, and the like, or implemented as a touch screen capable of performing an operation input function together therewith. Here, the button may be a button of various types such as a mechanical button, a touch pad, or a wheel which is formed at a random area at a front surface part or a side surface part, a rear surface part, or the like of an exterior of a main body of the remote control device 100.

The memory 120 may refer to a hardware that stores information such as data in electric or magnetic form for the processor 140 and the like to access. To this end, the memory 120 may be implemented as at least one hardware from among a non-volatile memory, a volatile memory, a flash memory, a hard disk drive (HDD) or a solid state drive (SSD), a random access memory (RAM), a read only memory (ROM), and the like.

In the memory 120, at least one instruction or a module necessary in an operation of the remote control device 100 or the processor 140 may be stored. Here, the instruction may be a code unit that instructs an operation of the remote control device 100 or the processor 140, and may be prepared in a machine language which is a language that can be understood by a computer. The module may be a series of instruction sets that perform a specific work of a work unit.

The memory 120 may be stored with data which is information in a bit or byte unit that can represent a character, a number, an image, and the like. For example, the memory 120 may be stored with information on control commands for controlling the electronic device 200 as a binary code. Here, the binary code may be a code by an NEC protocol.

The memory 120 may be accessed by the processor 140 and reading, writing, modifying, deleting, updating, and the like of the instruction, the module, or data may be performed by the processor 140.

The communication interface 130 may be a configuration that performs communication with an external device of various types according to communication methods of various types. For example, the remote control device 100 may transmit a control command for controlling the electronic device 200 to the electronic device 200 through the communication interface 130.

The communication interface 130 may include a Wi-Fi module, a Bluetooth module, an infrared communication module, a wireless communication module, and the like. Here, each communication module may be implemented in at least one hardware chip form.

The Wi-Fi module and the Bluetooth module may perform communication in a Wi-Fi method and a Bluetooth method, respectively. When using the Wi-Fi module or the Bluetooth module, various connection information such as a service set identifier (SSID) and a session key may first be transmitted and received, and after communicatively connecting using the same, various information may be transmitted and received. The infrared communication module may perform communication according to an infrared communication (Infrared Data Association (IrDA)) technology of transmitting data wirelessly in short range by using infrared rays present between visible rays and millimeter waves.

The wireless communication module may include at least one communication chip that performs communication according to various wireless communication standards such as, for example, and without limitation, ZigBee, 3rd Generation (3G), 3rd Generation Partnership Project (3GPP), Long Term Evolution (LTE), LTE Advanced (LTE-A), 4th Generation (4G), 5th Generation (5G), and the like, in addition to the above-described communication methods.

Alternatively, the communication interface 130 may include wired communication interfaces such as, for example, and without limitation, HDMI, DP, Thunderbolt, USB, RGB, D-SUB, DVI, and the like.

In addition thereto, the communication interface 130 may include at least one from among the wired communication modules that perform communication using a local area network (LAN) module, an Ethernet module, or a pair cable, a coaxial cable, an optical fiber cable, or the like.

The processor 140 may control the overall operation of the remote control device 100. Specifically, the processor 140 may control the overall operation of the remote control device 100 by being connected with each configuration of the remote control device 100. For example, the processor 140 may be connected with the user interface 110, the memory 120, and the communication interface 130 and control an operation of the remote control device 100.

According to an embodiment, the processor 140 may be implemented as a digital signal processor (DSP), a microprocessor, or a time controller (TCON). However, the embodiment is not limited thereto, and may include one or more from among a central processing unit (CPU), a micro controller unit (MCU), a micro processing unit (MPU), a controller, an application processor (AP), a communication processor (CP), or an ARM processor, or may be defined by the corresponding term. In addition, the processor 140 may be implemented as a System on Chip (SoC) or a large scale integration (LSI) embedded with a processing algorithm, and may be implemented in the form of a field programmable gate array (FPGA).

The processor 140 may identify, based on a user command receiving through the user interface 110, a binary code corresponding to the user command from among a plurality of binary codes stored in the memory 120. For example, the processor 140 may identify, based on a user command of turning on the electronic device 200 being input, a binary code corresponding to the user command of turning on the electronic device 200 from among the plurality of binary codes stored in the memory 120.

The processor 140 may identify, based on the pre-set number of bit units, the plurality of bit groups corresponding to the binary code. For example, the processor 140 may identify, based on a unit of 3 bits, the plurality of bit groups corresponding to the binary code. Here, the pre-set number of bit units may be determined by a manufacturer of the remote control device 100. However, the above is not limited thereto, and the pre-set number of bit units may vary.

The processor 140 may control the communication interface 130 to transmit a pulse signal corresponding to the plurality of bit groups. In the above-described example, the processor 140 may control the communication interface 130 to transmit a first pulse signal corresponding to a first bit group from among the plurality of bit groups, and control the communication interface 130 to transmit a second pulse signal corresponding to a second bit group directly after the first bit group from among the plurality of bit groups.

The processor 140 may control the communication interface 130 to determine a pulse of a first group and an interval between pulses of a second group directly after the first group based on binary data of the first group from among the plurality of bit groups. For example, the pulse of the first group and the interval between pulses of the second group may be proportionate to a size of binary data in the first group. In an example, the interval between pulses may become bigger as the size of binary data in the bit group become bigger.

However, the above is not limited thereto, and the interval between pulses may be determined based on at least one from among a distribution of a user command or a use distribution of binary data of a bit group. For example, if '010' is most used from among the binary data of the bit group, a pulse of '010' and an interval with a pulse directly after '010' may be set to the smallest.

The plurality of bit groups may be all same in terms of a width of a pulse. That is, the plurality of bit groups may be divided into an interval between pulses.

The processor 140 may change the pre-set number of bit units based on a battery state of the remote control device 100. For example, the processor 140 may increase, based on a battery of the remote control device 100 being less than a threshold value, the pre-set number of bit units. In this case, a number of pulses may be reduced and power consumption may be further reduced. For example, if the pre-set number of bit units is increased from 3 to 4, the binary code may be identified as a bit group of a smaller number, and the number of pulses may be reduced. However, if the pre-set number of bit units is 3, a total of 8 types of pulse signals may be necessary. If the pre-set number of bit units is 4, a total of 16 types of pulse signals may be necessary, and so long as the plurality of bit groups are identified with the interval between pulses, time for transmitting a whole binary code may become longer.

The processor 140 may control the communication interface 130 to transmit header data included with information about the pre-set number of bit units.

The processor 140 may control the communication interface 130 to transmit a pulse signal corresponding to header data, and transmit a pulse signal corresponding to the plurality of bit groups, and the pulse signal corresponding to the header data may include a pulse of 1.2 ms and a low value of 1.2 ms. That is, time for transmitting header data may be reduced compared the related art.

Figure 4:
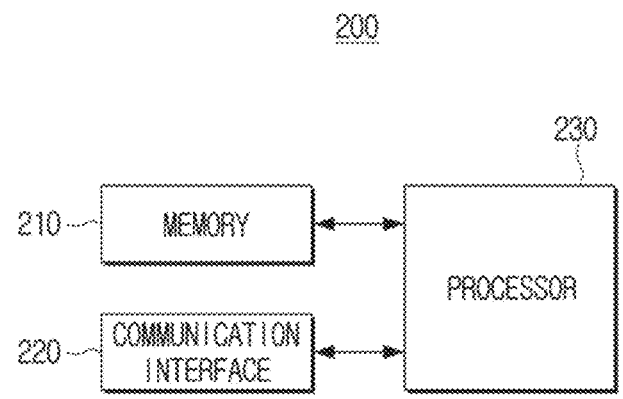
FIG. 4 illustrates a configuration of an electronic device according to an embodiment of the disclosure.

FIG. 4 is a block diagram illustrating a configuration of the electronic device 200 according to an embodiment of the disclosure.

Referring to FIG. 4, the electronic apparatus 200 may include a memory 210, a communication interface 220, and a processor 230.

The memory 210 may refer to a hardware that stores information such as data in electric or magnetic form for the processor 230 and the like to access. To this end, the memory 210 may be implemented as at least one hardware from among a non-volatile memory, a volatile memory, a flash memory, a hard disk drive (HDD) or a solid state drive (SSD), a random access memory (RAM), a read only memory (ROM), and the like.

In the memory 210, at least one instruction or a module necessary in an operation of the electronic device 200 or the processor 230 may be stored. Here, the instruction may be a code unit that instructs an operation of the electronic device 200 or the processor 230, and may be prepared in a machine language which is a language that can be understood by a computer. The module may be a series of instruction sets that perform a specific work of a work unit.

The memory 210 may be stored with data which is information in a bit or byte unit that can represent a character, a number, an image, and the like. For example, the memory 210 may be stored with information on control commands for controlling the electronic device 200 as a binary code.

The memory 210 may be accessed by the processor 230, and reading, writing, modifying, deleting, updating, and the like of the instruction, the module, or data may be performed by the processor 230.

The communication interface 220 may be a configuration that performs communication with an external device of various types according to communication methods of various types. For example, the electronic device 200 may receive a control command from the remote control device 100 through the communication interface 220.

The communication interface 220 may include a Wi-Fi module, a Bluetooth module, an infrared communication module, a wireless communication module, and the like. Here, each communication module may be implemented in at least one hardware chip form.

The Wi-Fi module and the Bluetooth module may perform communication in a Wi-Fi method and a Bluetooth method, respectively. When using the Wi-Fi module or the Bluetooth module, various connection information such as SSID and session key may first be transmitted and received, and after communicatively connecting using the same, various information may be transmitted and received. The infrared communication module may perform communication according to infrared communication (Infrared Data Association (IrDA)) technology of transmitting data wirelessly in short range by using infrared rays present between visible rays and millimeter waves.

The wireless communication module may include at least one communication chip that performs communication according to various wireless communication standards such as, for example, and without limitation, ZigBee, 3rd Generation (3G), 3rd Generation Partnership Project (3GPP), Long Term Evolution (LTE), LTE Advanced (LTE-A), 4th Generation (4G), 5th Generation (5G), and the like, in addition to the above-described communication methods.

Alternatively, the communication interface 220 may include wired communication interfaces such as, for example, and without limitation, High-Definition Multimedia Interface (HDMI), digital port (DP), Thunderbolt, universal serial bus (USB), RGB, D-subminiature (D-SUB), digital visual interface (DVI), and the like.

In addition, the communication interface 220 may include at least one from among the wired communication modules that perform communication using a local area network (LAN) module, an Ethernet module, or a pair cable, a coaxial cable, an optical fiber cable, or the like.

The processor 230 may control the overall operation of the electronic device 200. Specifically, the processor 230 may control the overall operation of the electronic device 200 by being connected with each configuration of the electronic device 200. For example, the processor 230 may be connected with the memory 210 and the communication interface 220 and control an operation of the electronic device 200.

According to an embodiment, the processor 230 may be implemented as a digital signal processor (DSP), a microprocessor, or a time controller (TCON). However, the embodiment is not limited thereto, and may include one or more from among a central processing unit (CPU), a micro controller unit (MCU), a micro processing unit (MPU), a controller, an application processor (AP), a communication processor (CP), or an ARM processor, or may be defined by the corresponding term. In addition, the processor 230 may be implemented as a System on Chip (SoC) or a large scale integration (LSI) embedded with a processing algorithm, and may be implemented in the form of a field programmable gate array (FPGA).

The processor 230 may identify, based on a pulse signal being received from the remote control device 100 through the communication interface 220, a plurality of bit groups based on the interval between pulses included in the pulse signal, identify a binary code corresponding to the plurality of bit groups from among a plurality of binary codes stored in the memory 210, and perform an operation corresponding to the identified binary code.

The processor 230 may identify a number of bits corresponding to respective pulses included in a pulse signal based on header data included in the pulse signal, and identify the plurality of bit groups based on a number of identified bits and an interval between pulses included in the pulse signal.

In an embodiment, the respective bit groups may be 3 bits. In an example, the processor 230 may identify the number of bits corresponding to the respective pulses included in the pulse signal as 3 based on the header data included in the pulse signal, and identify the plurality of bit groups which is respectively 3 bits based on the interval between pulses included in the pulse signal.

In the above, the method of reducing power consumption of the remote control device 100 and the operation of the electronic device 200 based therefrom have been described.

An operation of the remote control device 100 will be described in greater detail below through FIG. 5 to FIG. 8. In FIG. 5 to FIG. 8, separate embodiments will be described for convenience of description. However, the separate embodiments of FIG. 5 to FIG. 8 may be implemented in a combined state at any time.

FIG. 5 is a diagram illustrating an operation of identifying a plurality of bit groups as corresponding to a binary code, according to an embodiment of the disclosure.

As shown in FIG. 5, the processor 140 may identify, based on the unit of 3 bits, as a plurality of bit groups corresponding to a binary code corresponding to a user command. In an example, the processor 140 may identify a binary code of 0000 0111 0000 0111 0001 0000 1110 1111 as 11 bit groups of 000 001 110 000 011 100 010 000 111 011 110. From the above, 0 of the last 110 may be a dummy 0 added to identify the bit group in the unit of 3 bits.

The processor 140 may represent one bit group as one pulse, and compared to when one pulse was represented as one bit conventionally, power consumption may be reduced because the number of pulses is reduced.

In FIG. 5, a unit of 3 bits has been provided as an example for convenience of description, but the processor 140 may use a various number of bit units of any amount. In addition, the processor 140 may change the number of bit units based on the battery state of the remote control device 100. For example, the processor 140 may increase, based on the battery of the remote control device 100 being less than the threshold value, the number of bit units. In this case, the number of pulses may be reduced, but time for transmitting a user command to the electronic device 200 may be increased.

Figure 6:
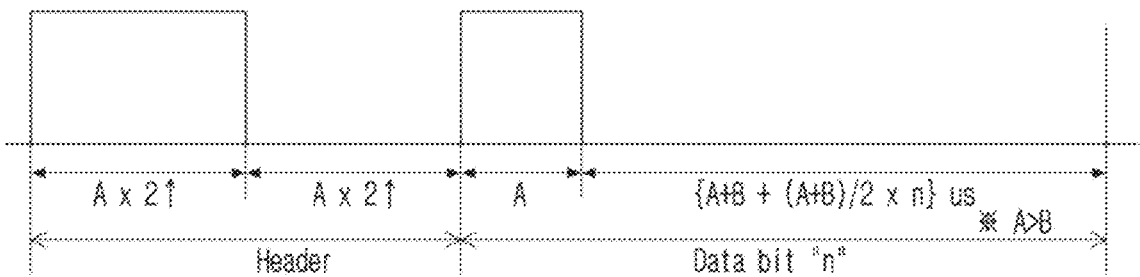
FIG. 6 illustrates a pulse form based on binary data of a bit group according to an embodiment of the disclosure.

FIG. 6 is a diagram illustrating a pulse form based on binary data of a bit group according to an embodiment of the disclosure.

As shown in FIG. 6, if a width of one pulse is determined as Aμs in a data signal, a low value (interval) following the pulse in the data signal may be determined as (A+B+(A+B)/2×n)μs. Here, n may represent a decimal number of binary data of a bit group.

For example, a decimal value of 000 may be 0, and in this case, the width of the pulse may be Aμs, and the low value following the pulse may be A+Bμs. A decimal value of 001 may be 1, and in this case, the width of the pulse may be Aμs, and the low value following the pulse may be (A+B)×1.5 μs. A decimal value of 010 may be 2, and in this case, the width of the pulse may be Aμs, and the low value following the pulse may be (A+B)×2 μs. Based on the method above, the low value following the pulse for all bit groups may be determined.

A width of a pulse of header data may be determined greater than A×2. In addition, a low value of header data may be determined greater than A×2.

Figure 7:
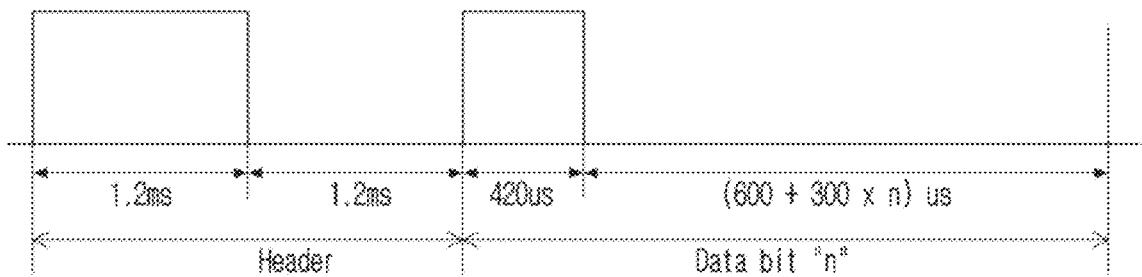
FIG. 7 is a illustrates an example of a pulse form based on binary data of a bit group according to an embodiment of the disclosure.

FIG. 7 is a diagram illustrating in detailed an example of a pulse form based on binary data of a bit group according to an embodiment of the disclosure.

In FIG. 7, an example of A being 420, and B being 180 has been assumed. Accordingly, a pulse of the data signal may be 420ρs, a low value following a pulse of 000 may be 600ρs, a low value following a pulse of 001 may be 900ρs, and a low value following a pulse of 010 may be 1200ρs. Through the method described above, the low value following the pulse for all bit groups may be determined, and a low value following a pulse of 111 may be 2700ρs.

The width of the pulse of the header data may be determined as 1.2 ms, and the low value of the header data may also be determined as 1.2 ms.

In FIG. 6 and FIG. 7, although the width of the pulse of all bit groups has been described as the same, and the low value following the pulse has been described as different, but the above is not limited thereto. For example, in the above-described example, a width of a pulse of 000, 001, 010, and 011 may be Aμs, and a width of a pulse of 100, 101, 110, and 111 may be 2Aμs. In this case, the low value following the pulse may be 4 types. In an example, in the above-described example, a low value following the pulse of 000, 001, 010, and 011 may be 600ρs, 900ρs, 1200ρs, and 1500μ, respectively, and a low value following the pulse of 100, 101, 110, and 111 may be 600ρs, 900ρs, 1200ρs, and 1500ρs, respectively. That is, power consumption may be partially increased according to the width of the pulse of 100, 101, 110, and 111 becoming greater than in FIG. 7, but the time for transmitting the user command to the electronic device 200 may be reduced.

Based on using a feature of the time for transmitting the user command to the electronic apparatus 200 being reduced as described above, transmission time may not be excessively increased even when the pre-set number of bit units is increased. For example, the processor 140 may increase, based on the battery of the remote control device 100 being less than the threshold value, the pre-set number of bit units from 3 to 4, and at this time, the width of pulse for 8 from among a total of 16 bit groups may be Aμs, and the width of pulse of the remaining 8 may be determined as Aμs. In this case, the low value following the pulse may be 8 types and the transmission time of the user command may be reduced compared to when it is 16 types.

Figure 8:
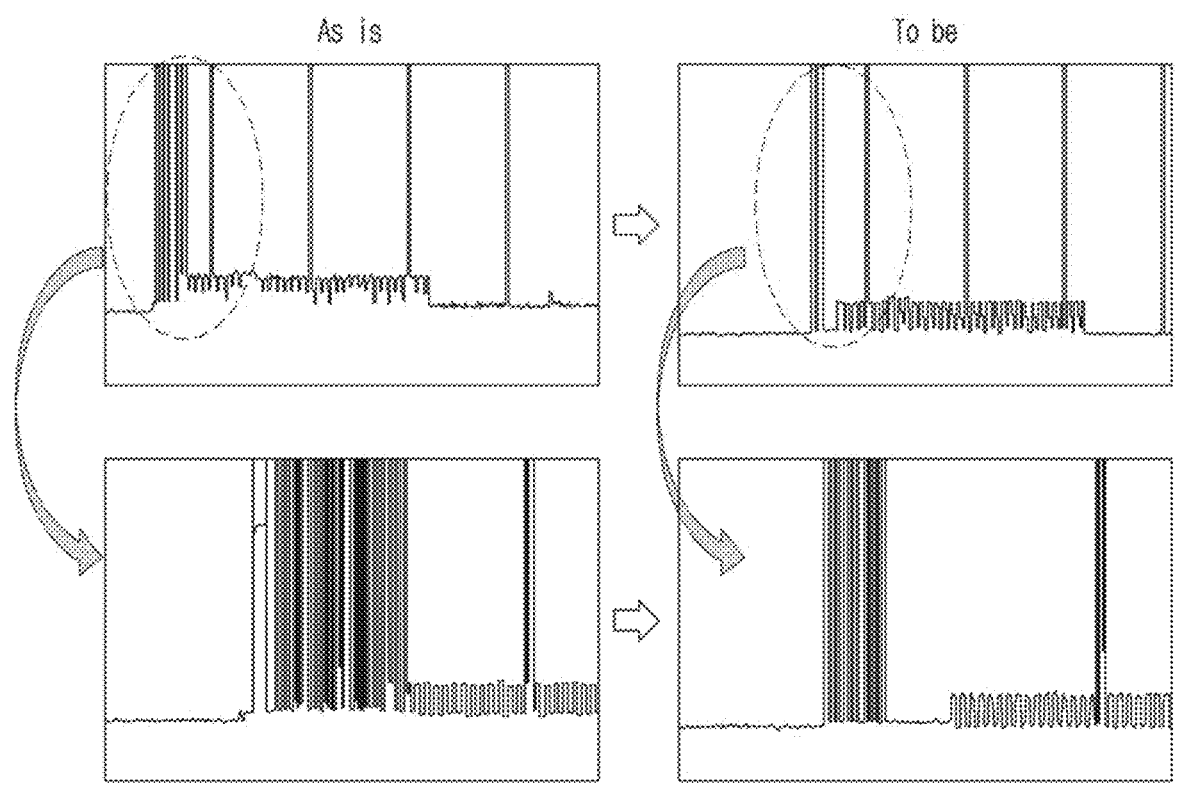
FIG. 8 illustrates an effect according to an embodiment of the disclosure.

FIG. 8 is a diagram illustrating an effect according to an embodiment of the disclosure.

A left upper end in FIG. 8 is a diagram illustrating a pulse signal of related art, a left lower end in FIG. 8 is an enlarged diagram of header data in the pulse signal of the related art, and a pulse signal for a binary code.

A right upper end in FIG. 8 is a diagram showing a pulse signal of the disclosure, and a right lower end in FIG. 8 is an enlarged diagram of header data in the pulse signal of the disclosure and a pulse signal for a binary code.

As shown at a right side in FIG. 8, power consumption of the remote control device 100 has been reduced as the number of pulses is reduced.

Figure 9:
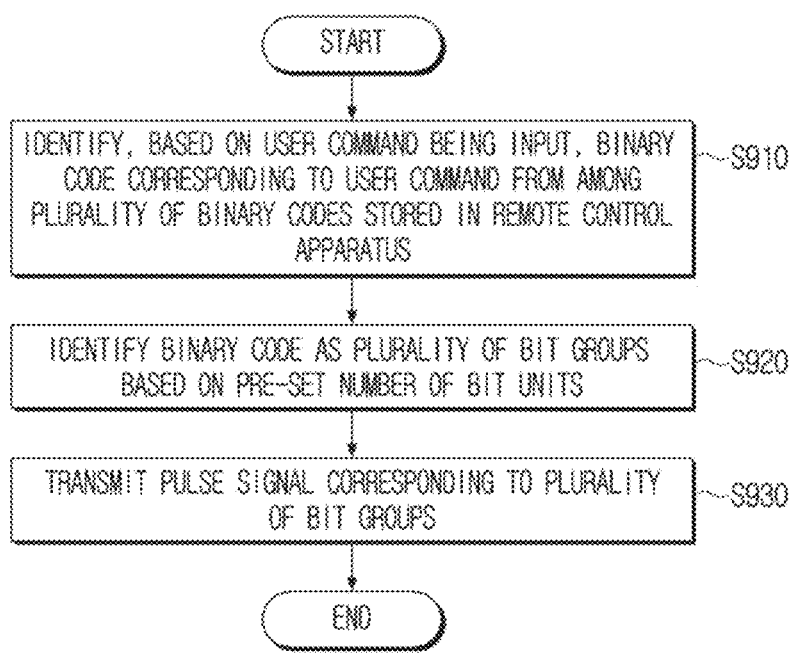
FIG. 9 illustrates control operations of a remote control device according to an embodiment of the disclosure.

FIG. 9 is a flowchart illustrating a method of a remote control device according to an embodiment of the disclosure.

First, based on a user command being input (or received from outside), a binary code corresponding to the user command may be identified from among a plurality of binary codes stored in the remote control device (S910). Then, the binary code may be identified as a plurality of bit groups based on a pre-set number of bit units (S920). Then, a pulse signal corresponding to the plurality of bit groups may be transmitted (S930).

Here, the identifying as the plurality of bit groups may include identifying the binary code as the plurality of bit groups based on a unit of 3 bits.

Then, the transmitting (S930) may include determining a pulse of the first group and an interval between pulses of the second group directly after the first group based on binary data of the first group from among the plurality of bit groups.

Here, the pulse of the first group and the interval between pulses of the second group may be proportionate to the size of binary data of the first group.

Meanwhile, the plurality of bit groups may be all same in terms of a width of the pulse.

Then, the method may further include changing the pre-set number of bit units based on the battery state of the remote control device.

Here, the transmitting (S930) may include transmitting the header data included with the information about the pre-set number of bit units.

Meanwhile, the transmitting (S930) may include transmitting a pulse signal corresponding to header data, and transmitting a pulse signal corresponding to the plurality of bit groups, in which the pulse signal corresponding to the header data may include a pulse of 1.2 ms and a low value of 1.2 ms.

Figure 10:
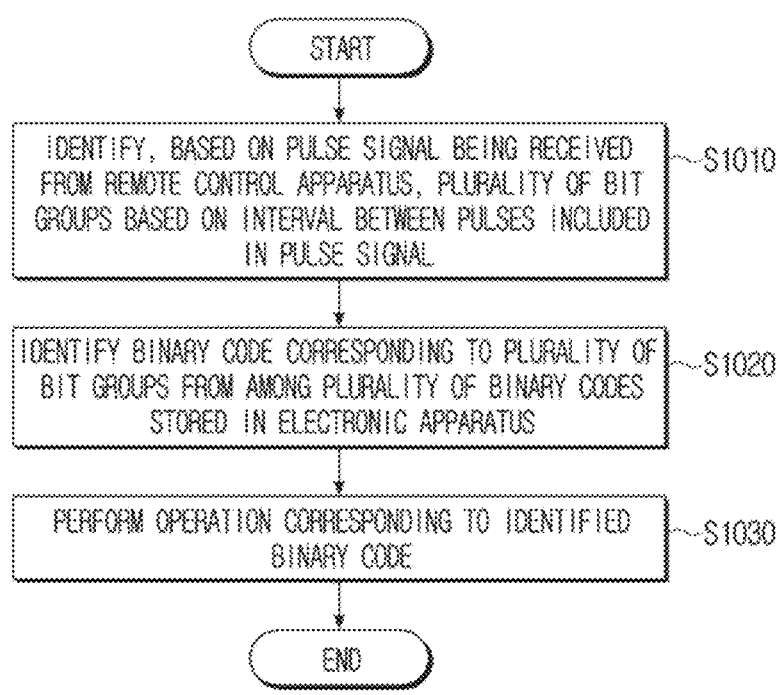
FIG. 10 illustrates control operations of an electronic device according to an embodiment of the disclosure.

FIG. 10 is a flowchart illustrating a method of an electronic device according to an embodiment of the disclosure.

First, based on a pulse signal being received from the remote control device, a plurality of bit groups may be identified based on an interval between pulses included in the pulse signal (S1010). Then, a binary code corresponding to the plurality of bit groups may be identified from among a plurality of binary codes stored in the electronic device (S1020). Then, an operation corresponding to the identified binary code may be performed (S1030).

Here, the identifying the plurality of bit groups (S1010) may include identifying a number of bits corresponding to the respective pulses included in the pulse signal based on header data included in the pulse signal, and identifying the plurality of bit groups based on the identified number of bits and the interval between pulses included in the pulse signal.

Then, the plurality of bit groups may be 3 bits, respectively.

According to the one or more embodiments of the disclosure as described above, the remote control device may reduce power consumption by transmitting the plurality of bits included in the binary code as one pulse signal for every pre-set number of bit units.

Meanwhile, according to an embodiment of the disclosure, the one or more embodiments described above may be implemented with software which includes instructions stored in a machine-readable storage medium (e.g., computer). The machine may call an instruction stored in the storage medium, and as a device operable according to the called instruction, may include an electronic device (e.g., electronic device (A)) according to the above-mentioned embodiments. Based on an instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in the storage medium.

In addition, according to an embodiment of the disclosure, a method according to the one or more embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be stored at least temporarily in the storage medium such as a server of a manufacturer, a server of an application store, or a memory of a relay server, or temporarily generated.

In addition, according to an embodiment of the disclosure, the one or more embodiments described above may be implemented in a recordable medium which is readable by a computer or a device similar to the computer using software, hardware, or the combination of software and hardware. In some cases, embodiments described herein may be implemented by the processor on its own. According to a software implementation, embodiments such as the procedures and functions described herein may be implemented as separate software modules. Each software modules may perform one or more functions and operations described herein.

The computer instructions for performing processing operations in the device according to the one or more embodiments described above may be stored in a non-transitory computer-readable medium. The computer instructions stored in this non-transitory computer-readable medium may cause a specific device to perform a processing operation of the device according to the above-described one or more embodiments when executed by a processor of the specific device. The non-transitory computer-readable medium may refer to a medium that stores data semi-permanently rather than storing data for a very short time, such as a register, a cache, a memory, or the like, and is readable by a device. Specific examples of the non-transitory computer-readable medium may include, for example, and without limitation, a compact disc (CD), a digital versatile disc (DVD), a hard disc, a Blu-ray disc, a USB, a memory card, a ROM, and the like.

In addition, each element (e.g., a module or a program) according to the one or more embodiments described above may be formed of a single entity or a plurality of entities, and some sub-elements of the abovementioned sub-elements may be omitted or other sub-elements may be further included in the one or more embodiments. Alternatively or additionally, some elements (e.g., modules or programs) may be integrated into one entity and perform the same or similar functions performed by each of the corresponding elements prior to integration. Operations performed by a module, a program, or other element, in accordance with the one or more embodiments, may be executed sequentially, in parallel, repetitively, or in a heuristically manner, or at least some operations may be performed in a different order, omitted, or a different operation may be added.

While the disclosure has been illustrated and described with reference to one or more embodiments thereof, it will be understood that the one or more embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A remote control device comprising:
   a user interface;
   a memory storing at least one instruction and a plurality of binary codes;
   a communication interface; and
   at least one processor operatively connected with the user interface, the memory, and the communication interface and configured to execute the at least one instruction to:
      identify, based on a user command receiving through the user interface, a binary code corresponding to the user command from among the plurality of binary codes,
      identify the binary code and regroup the binary code, based on a pre-set number of bit units, into a plurality of bit groups corresponding to the binary code, wherein the pre-set number of bit units is lower than a number of bits in the binary code, and
      control the communication interface to transmit a first pulse signal corresponding to the plurality of bit groups,
   wherein the at least one processor is configured to execute the at least one instruction further to control the communication interface to determine an interval between a pulse of a first group and a pulse of a second group directly after the first group based on a use distribution of binary data of the plurality of bit groups.

2. The remote control device of claim 1, wherein the pre-set number is 3.

3. The remote control device of claim 1, wherein the plurality of bit groups are all same in terms of a width of a pulse.

4. The remote control device of claim 1, wherein the at least one processor is configured to execute the at least one instruction further to change the pre-set number of bit units based on a battery state of the remote control device.

5. The remote control device of claim 4, wherein the at least one processor is configured to execute the at least one instruction further to control the communication interface to transmit header data comprising information about the pre-set number of bit units.

6. The remote control device of claim 1, wherein the at least one processor is configured to execute the at least one instruction further to control the communication interface to transmit a second pulse signal corresponding to header data, and to transmit the first pulse signal corresponding to the plurality of bit groups, and
   wherein the second pulse signal comprises a pulse of 1.2 ms and a low value of 1.2 ms.

7. A method performed by a remote control device, the method comprising:
   identifying, based on a user command, a binary code corresponding to the user command from among a plurality of binary codes stored in the remote control device;
   identifying the binary code and regroup the binary code, based on a pre-set number of bit units, into a plurality of bit groups corresponding to the binary code, wherein the pre-set number of bit units is lower than a number of bits in the binary code,; and
   transmitting a pulse signal corresponding to the plurality of bit groups,
   wherein the transmitting the pulse signal corresponding to the plurality of bit groups comprises determining an interval between a pulse of a first group and a pulse of a second group directly after the first group based on a use distribution of binary data of the plurality of bit groups.

8. The method of claim 7, wherein the pre-set number is 3.

9. The method of claim 7, wherein the plurality of bit groups are all same in terms of a width of a pulse.

10. The method of claim 7, further comprising changing the pre-set number of bit units based on a battery state of the remote control device.

11. The method of claim 10, wherein the transmitting the pulse signal corresponding to the plurality of bit groups comprises transmitting header data comprising information about the pre-set number of bit units.

* * * * *